Figure 1:
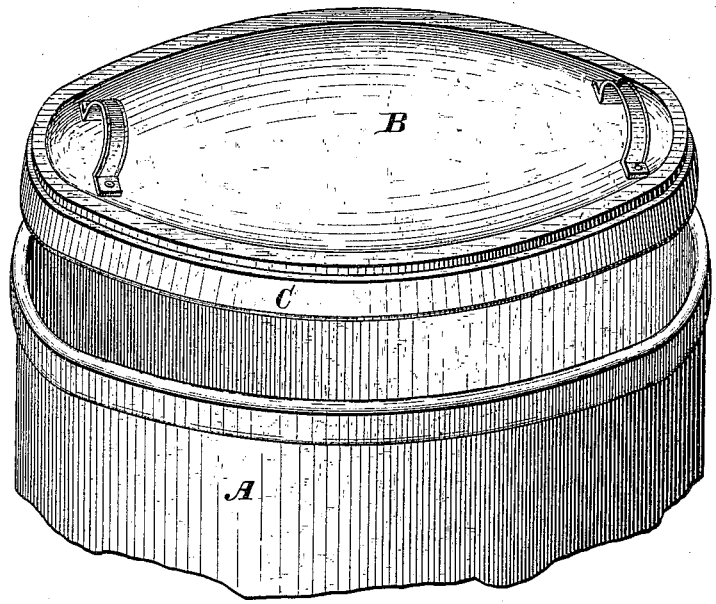

(No Model.)

H. L. IVES.
MILK CAN COVER.

No. 323,153. Patented July 28, 1885.

ATTEST.
J. Henry Kaiser
E. Sanford

Hallam L. Ives INVENTOR

UNITED STATES PATENT OFFICE.

HALLAN L. IVES, OF POTSDAM, NEW YORK.

MILK-CAN COVER.

SPECIFICATION forming part of Letters Patent No. 323,153, dated July 28, 1885.

Application filed May 7, 1885. (No model.)

*To all whom it may concern:*

Be it known that I, HALLAN L. IVES, a citizen of the United States, residing at Potsdam, St. Lawrence county, New York, have invented a certain new and useful Improvement in Milk-Can Covers, by which milk may be conveyed along the dusty highway without danger of loss by slopping, and at the same time be entirely free from the accumulation of dust and sand; and I do hereby declare that the following is a full, clear, and exact description of the invention, which will enable others skilled in the art to which it appertains to make and use the same.

Heretofore milk-can covers have been made in the form of a slip cover, wholly of tin, with only a deep or wide flange on the cover to prevent the milk from slopping and to keep the cover in place. These slip covers have usually been made with a convex top, thereby forming a complete shed for all the sand and dust that the can may catch, and in effect the milk is in the same condition when it reaches the factory that it would have been had it gone without a cover. The wide flange before mentioned, while it keeps the cover in place when the can is new, (if nicely fitted,) must of necessity permit a more or less open joint between the cover and the can to always exist. This joint quickly fills with the sand, which naturally slides off the convex top, the smaller particles of which drop through into the milk, while the larger particles are retained in the joint to cut and grind the metal when the cover is drawn from the can. This grinding process soon has the effect to remove all the tin coating from the inside of the can and the outside of the flange, thereby making the can larger in diameter and the cover smaller, with the result that in time the cover becomes loose and is only held from dropping down into the milk by dents made in the sides of the can. These dents simply serve to make the joint more open and to allow the milk to slop out. To obviate these objections, therefore, the design of my invention is to make a cover provided with an elastic or yielding engaging-rim, and which, on being pressed snugly into the can, will remain securely in place, and at the same time close the joint so tightly as to prevent any dirt or dust from getting access to the milk, and to entirely prevent the milk from slopping out. To further facilitate this design, I make the top of the cover of such shape as to retain the sand and dirt that may fall thereupon while in transit, instead of sliding it off into the joint to drop into the milk when the cover is drawn out of the can. These objects I attain by the means illustrated in the accompanying drawings, making part of this specification, in which—

Figure 2:
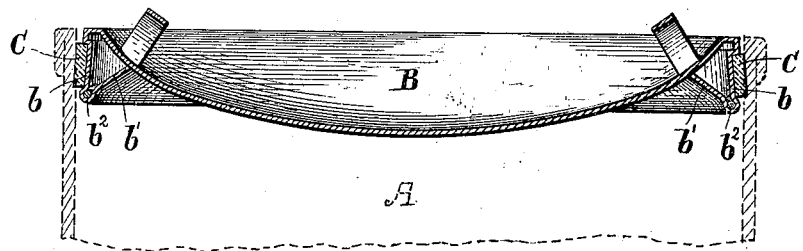

Figure 1 is a detail perspective view of the upper end of an open-mouthed milk-can, and showing my improved cover ready to be dropped into place. Fig. 2 is a central cross-section of the cover shown in Fig. 1, taken through the handles; and Fig. 3 a detail showing various modifications.

Similar letters refer to similar parts throughout the several views.

The sheet-metal can A is of the ordinary open-mouthed kind, having an annular body with a vertical wall. The cover B, instead of being plane or convexed upward, as usual, and provided with the ordinary annular downwardly-projecting deep peripheral flange or lip for engagement with the wall of the can, I make convexed downward, and thus cause it to present a concave face upward. The deep peripheral flange of the ordinary flat or convex cover I dispense with, and, by reason of the convexity underneath, I am enabled to secure a maximum of strength and rigidity with the minimum of weight by the construction shown at $b$ $b'$ $b^2$. This construction is as follows: The flange $b$ is turned down at the periphery of the cover for a short distance, at a right angle to the plane of the upper face thereof, and then turned upward again, as at $b'$, until its outer edge meets the convex or lower face of the cover. Thus the cover is provided with a braced peripheral flange—light, strong, and exceedingly well adapted for the hard usage to which it is subjected. If needful to secure increased strength a wire, $b^2$, may be carried around within the lower angle of the flange. The angle of the concavity in the upper surface of the cover is somewhat sharp at its edge, in order to retain the sand or dust should the cover be dipped slightly in withdrawing the same from the can.

Within a groove upon the outer face of the flange b, as thus described, I stretch a continuous band of soft elastic rubber, C. Preferably I seat the band within the groove, as shown, although it is obvious that a flat band might be operatively secured without such provision. Other packing might be advantageously employed, and such would manifestly be within the scope of this invention; but I prefer, for many reasons, to employ the substance indicated.

Figure 3:
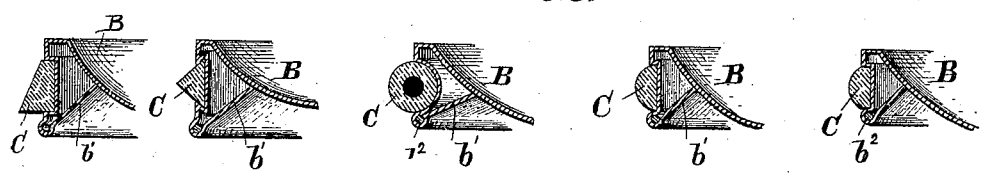

There is also choice in the shape of the band to be used. In Fig. 3 I have shown in cross-section four forms of band, by the use of each of which I have secured most excellent results. I prefer, however, for reasons which will appear presently, the form shown in Fig. 2, which is a plain flat band rectangular in cross-section. When this form is employed, however, the flange should be turned slightly outward at its lower edge, in order that the lowest edge of the band may be most prominent. This result, however, might be secured by making the band itself of unequal thickness at top and bottom, as shown in Fig. 3, and thus be adapted for use upon a cover whose flange should be turned down at an exact right angle to the plane thereof. The advantage in the slight projection of the lowest edge of the band arises from the fact, demonstrated by experiment, that a broad flat band of elastic material coming against the wall of the can does not close the joint so completely as an edge thereof; and, furthermore, it is found that if sufficient force is employed with the broad flat band in place, presenting its whole surface to the wall of the vessel, it requires, on account of atmospheric pressure, great effort to insert, adjust, and remove the cover; but with the elastic band, seated upon the flange, as herein described, presenting a single edge to the wall of the vessel, as a piston within a cylinder, I am enabled to operate the same easily, exclude all dust and dirt effectually, retain the cover at any desired point within the can, and at the same time prevent the slopping and spilling of the contents even in the slightest degree. An additional advantage is also gained in that slight variations in the size of different cans, resulting either from wear or from difference in manufacture, can always be quickly remedied by substituting a thicker for a thinner band, or vice versa, as may be desired; and as a long band is necessarily a thick band, and a short band, when stretched, is a thin one, this adjustment is always easily to be secured.

I am aware that packings of various kinds have been used to secure closely-fitting joints in various kinds of apparatus and that elastic packings are not, broadly, new; but, Having fully described my invention, what I claim as new, and desire to secure by Letters Patent of the United States, is—

1. The herein-described sheet-metal milk-can cover, the same consisting of the annular disk, concave upon its upper and convex upon its lower face and having a peripheral flange provided with an elastic band or packing, as set forth.

2. The herein-described sheet-metal milk-can cover, the same consisting of the annular disk, concave upon its upper and convex upon its lower face and having a peripheral flange turned down at substantially a right angle from the plane of the upper face of the cover and thence back to meet the convex lower face, as set forth, whereby the flange is braced and strengthened.

3. The herein-described sheet-metal milk-can cover, the same consisting of the annular disk, concave upon its upper and convex upon its lower face and having a peripheral flange turned down at substantially a right angle from the plane of the upper face of the cover and thence back to meet the convex lower face, the said flange being provided with an elastic band or packing, as set forth.

4. The herein-described sheet-metal milk-can cover, the same consisting of the annular disk, concave upon its upper and convex upon its lower face and having a peripheral flange provided with a flat elastic band or packing, rectangular in cross-section, one of the edges of which projects more prominently than the other, as set forth.

5. The herein-described sheet-metal milk-can cover, the same consisting of the annular disk, concave upon its upper and convex upon its lower face and having upon its periphery a flange turned down at substantially a right angle from the plane of the face of the cover, in combination with a vessel having a plane interior wall, whereby the cover may be set at any height within the vessel, and the sand and dirt falling upon the upper face of the cover are retained and prevented from working into the joint between the cover and the can, as set forth.

HALLAN L. IVES.

Witnesses:
C. E. SANFORD,
JAMES S. FOX.